US008205082B2

(12) United States Patent
Chu

(10) Patent No.: US 8,205,082 B2
(45) Date of Patent: Jun. 19, 2012

(54) DOMAIN UPGRADE METHOD IN DIGITAL RIGHTS MANAGEMENT

(75) Inventor: Youn-Sung Chu, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 782 days.

(21) Appl. No.: 12/267,313

(22) Filed: Nov. 7, 2008

(65) Prior Publication Data

US 2009/0125718 A1 May 14, 2009

(30) Foreign Application Priority Data

Nov. 8, 2007 (KR) .......................... 10-2007-0113952
Mar. 14, 2008 (KR) .......................... 10-2008-0024024

(51) Int. Cl.
*H04L 9/32* (2006.01)
(52) U.S. Cl. ........ 713/168; 713/155; 713/157; 713/163; 380/212; 380/278; 380/282; 709/245
(58) Field of Classification Search .................. 713/168, 713/155, 157, 158; 380/212, 277, 278, 282; 709/245
See application file for complete search history.

(56) References Cited

U.S. PATENT DOCUMENTS

| | | | | |
|---|---|---|---|---|
| 6,463,534 | B1 * | 10/2002 | Geiger et al. ................. | 713/168 |
| 6,684,331 | B1 * | 1/2004 | Srivastava ..................... | 713/163 |
| 7,103,185 | B1 * | 9/2006 | Srivastava et al. ............ | 380/277 |
| 7,434,046 | B1 * | 10/2008 | Srivastava ..................... | 713/163 |
| 7,703,128 | B2 * | 4/2010 | Cross et al. ........................ | 726/6 |
| 2002/0010794 | A1 * | 1/2002 | Stanbach, Jr. et al. ........ | 709/245 |
| 2002/0157002 | A1 | 10/2002 | Messerges et al. | |
| 2004/0103312 | A1 | 5/2004 | Messerges et al. | |
| 2005/0071280 | A1 | 3/2005 | Irwin et al. | |
| 2005/0102513 | A1 * | 5/2005 | Alve ............................. | 713/168 |
| 2007/0165854 | A1 * | 7/2007 | Higashi et al. ................ | 380/212 |
| 2007/0214357 | A1 * | 9/2007 | Baldus et al. ................. | 713/157 |
| 2007/0242821 | A1 | 10/2007 | Kim et al. | |
| 2008/0260162 | A1 * | 10/2008 | Jung et al. ..................... | 380/278 |
| 2009/0190758 | A1 * | 7/2009 | Pourzandi et al. ............ | 380/255 |
| 2009/0217036 | A1 * | 8/2009 | Irwin et al. .................... | 713/168 |

OTHER PUBLICATIONS

International Search Report and Written Opinion for International Appl. No. PCT/KR2008/006417, mailed Apr. 29, 2009.

* cited by examiner

*Primary Examiner* — Thu Ha Nguyen
(74) *Attorney, Agent, or Firm* — Birch, Stewart, Kolasch & Birch, LLP

(57) ABSTRACT

Disclosed is domain upgrade method in Digital Rights Management (DRM) capable of reducing network resources by simplifying signal procedures at the time of transferring changed domain keys. A device joining after domain upgrade is provided with only a domain key of a domain generation after the domain upgrade, but is not provided with a domain key of the previous domain generation. Accordingly, even if the joining device is mal-operated or is hacked, contents before upgrade are prevented from being illegally used or leaking out.

13 Claims, 11 Drawing Sheets

FIG. 3

| | User Domain(G0) | User Domain(G1) |
|---|---|---|
| First device | Domain Key($DK_0$)<br>Domain Authority($RO_0$)<br>Digital Contents($DCF_0$) | Domain Key ($DK_0$)<br>Domain Key ($DK_1$)<br>Domain Authority($RO_0$)<br>Domain Authority($RO_1$)<br>Digital Contents($DCF_0$)<br>Digital Contents($DCF_1$) |
| Second device | Domain Key($DK_0$)<br>Domain Authority($RO_0$)<br>Digital Contents($DCF_0$) | X |
| third device | | Domain Key ($DK_0$)<br>Domain Key ($DK_1$)<br>Domain Authority($RO_0$)<br>Domain Authority($RO_1$)<br>Digital Contents($DCF_0$)<br>Digital Contents($DCF_1$) |
| Status | Mal-Operation of Second Device | Mal-Operation of Third Device |

FIG. 5

|  | User Domain(G0) | User Domain(G1) |
|---|---|---|
| First Device | Domain Key ($DK_0$)<br>Domain Authority($RO_0$)<br>Digital Contents($DCF_0$) | Domain Key ($DK_0$)<br>Domain Key ($DK_1$)<br>Domain Authority($RO_0$)<br>Domain Authority($RO_1$)<br>Digital Contents($DCF_0$)<br>Digital Contents($DCF_1$) |
| Second Device | Domain Key($DK_0$)<br>Domain Authority($RO_0$)<br>Digital Contents($DCF_0$) | X |
| Third Device |  | Domain Key($DK_1$)<br>Domain Authority($RO_1$)<br>Digital Contents($DCF_1$) |
| Status | Mal-Operation of Second Device | Mal-Operation of Third Device |

FIG. 9

|  | User Domain(G0) | User Domain(G1) |
|---|---|---|
| First Device | First Domain Key ($MDK_0$)<br>Domain Authority($RO_0$)<br>Digital Contents($DCF_0$) | First Domain Key ($MDK_0$)<br>First Domain Key ($MDK_1$)<br>Domain Authority($RO_0$)<br>Domain Authority($RO_1$)<br>Digital Contents($DCF_0$)<br>Digital Contents($DCF_1$) |
| Second Device | First Domain Key ($MDK_0$)<br>Domain Authority($RO_0$)<br>Digital Contents($DCF_0$) | X |
| Third Device |  | First Domain Key ($MDK_1$)<br>Domain Authority($RO_1$)<br>Digital Contents($DCF_1$) |
| Status | Mal-Operation of Second Device | Mal-Operation of Third Device |

DOMAIN UPGRADE METHOD IN DIGITAL RIGHTS MANAGEMENT

RELATED APPLICATION

The present disclosure relates to subject matter contained in priority Korean Applications No. 10-2007-0113952 filed on Nov. 8, 2007 and No. 10-2008-0024024 filed on Mar. 14, 2008, which are herein expressly incorporated by reference in their entireties.

BACKGROUND OF THE INVENTION

1. Field of the Invention

The present invention relates to a digital rights management (DRM), and particularly, to domain upgrade method in DRM.

2. Background of the Invention

In general, a Digital Rights Management (DRM) is technique to protect a rights object (RO) for digital contents and systematically manage it, and provides a protecting and managing scheme for preventing an illegal copy of the contents, obtaining the RO, creating/moving the contents, and consuming the RO and the contents.

A DRM system includes a Contents Issuer (CI) and a Rights Issuer (RI). The DRM system controls a user to consume contents issued by the CI only in a right-limit of RO provided from the RI.

More concretely, the CI issues contents protected by a specific encryption key against an unauthorized user. And, the RI issues an RO necessary to consume the protected contents.

A DRM agent is mounted at a device (or terminal) thus to receive the protected contents and ROs, and controls consumption of the DRM contents by analyzing a 'License' contained in the RO, and by converting the protected DRM contents to contents that can be consumed at a corresponding DRM device.

Here, the device indicates a device including a DRM Agent, which is a domain member that has joined a domain.

In the DRM system, based on a newly introduced domain concept, devices inside a specific domain allow to share an RO with other devices. For instance, if a device, 'A' has an RO for consuming contents, the RO is shared with a plurality of devices for consumption.

Here, devices that belong to the domain (i.e., joined devices) are called as 'domain members', and each domain member shares a common domain key (DK).

The domain key is used to decode a domain RO. Here, the domain RO is an RO shared among devices inside the domain, and includes an RO and state information issued from the RI.

Details about the domain are described in standardized documents by Open Mobile Alliance, a group for application software standardization of a mobile device.

FIG. 1 is an exemplary view showing a domain in accordance with the conventional art, and FIG. 2 is a flowchart showing a DRM system of FIG. 1 in accordance with the conventional art.

As shown in FIG. 1, a domain 20 includes a plurality of members, i.e., first to fourth devices (11~14, will be referred to as a representative reference numeral '10') that share contents.

And, an entity for managing the domain 20 includes a Contents Issuer (CI) 30, and a Rights Issuer (RI) 40.

The CI 30 serving as an entity to provide contents, encrypts contents, for example, as a DRM contents format (DCF), and sends the encrypted contents to the device 10 inside the domain 20.

The RI 40 serves to provide a domain RO about the issued contents.

The operation of the conventional DRM system will be explained with reference to FIGS. 1 and 2.

Firstly, the devices 11~14 send a message requesting to join a domain (e.g., Join Domain Request message) to the RI 40 (S11).

The RI 40 creates a domain key about the domain 20 (S12).

Then, in response to the request, the RI 40 sends the generated domain key to the devices 11~14, with including in a message responding with respect to join a domain (e.g., Join Domain Response message) (S13).

Referring to FIG. 1, the RI 40 sends a domain RO to any device among the devices 11~14, e.g., the first device 11.

The CI 30 provides encrypted contents, to any device among the devices 11~14, e.g., the first device 11.

Once said any device, e.g., the first device 11 receives the contents and the RO, the first device 11 sends the received contents and RO to the second to fourth devices (12~14) for sharing. Here, the first to fourth devices (11~14) may share ROs issued from different RIs.

Once the contents and the RO are received, the first to fourth devices (11~14) decode the RO by using the domain key, and then consume the contents according to Permission and/or Constraint included in the RO.

Here, if the fourth device 14 inside the domain 20 is mal-operated, or is hacked by a malicious user, the contents may leak out or may be illegally used. When the contents have a possibility to be illegally consumed, the domain can be upgraded.

A process for upgrading the domain will be explained as follows.

Firstly, the RI 40 updates a domain key (S14). Then, the RI 40 sends a message inducing to join a domain (e.g., DMP Join Domain Trigger message) to other devices 11~13 rather than the fourth device 14 (S15). In response to the reception, the other devices 11~13 sends a message requesting to join a domain (e.g., Join Domain Request message), to the RI 40 (S16). The RI 40 sends the updated domain key to the other devices 11~13, with including in a message responding with respect to join a domain (e.g., DMP Join Domain Response message) (S17).

The RI 40 updates the RO, and sends the updated RO to the other devices 11~13.

After the domain 20 has been upgraded, if a new device requests the domain 20 to join the domain 20, the RI 40 provides, to the new device, not only the updated domain key and domain RO, but also the domain RO and the domain key before upgrade, so that the new device can consume not only contents after upgrade but also contents before upgrade.

However, if the new device is mal-operated, or is hacked by a malicious user after upgrade, the contents before upgrade may leak out or may be illegally used, since the new device has been provided with both the domain RO and the domain key before upgrade.

FIG. 3 is an exemplary view showing domain members, and domain keys issued to the domain members according to each domain generation.

Referring to FIG. 3, the horizontal axis represents G0 and G1, respectively indicating first generation (G0) and second generation (G1) of the domain 20. And, the vertical axis represents the first device 11, the second device 12, and the third device 13.

As shown in FIG. 3, the first device 11 and the second device 12 firstly request to join the first generation (G0), and receive, from the RI 40, a domain key of version 1 ($DK_0$) issued thereto (S11~S13). And, the first device 11 and the second device 12 receive the domain RO of version 1 ($RO_0$), and digital contents of version 1 ($DCF_0$) for sharing.

Here, if it is determined that the second device 12 of the domain member is a malicious device, the RI 40 revokes the second device 12 from the domain 20.

And, the RI 40 upgrades generation of the domain 20 to a second generation from a first generation. And, the RI 40 updates the domain key of version 1 ($DK_0$) into a domain key of version 2 ($DK_1$) (S14), and sends a message inducing to join a domain (e.g., Join Domain Trigger message) to the other device 11 rather than the second device 12 (S15). Once receiving a message requesting to join a domain (e.g., Join Domain Request message) from the first device 11 (S16), the RI 40 sends a message responding with respect to join a domain (e.g., Join Domain Response message), to the first device 11, with including the domain key of version 2 ($DK_1$) therein (S17).

After the domain 20 is upgraded to the second generation (G1) from the first generation (G0) by the RI 40, when the third device 13 requests to join the domain 20, the RI 40 sends, to the third device 13, not only the domain key of version 2 ($DK_1$), but also the domain key of version 1 ($DK_0$). Here, the domain keys are issued through S11, S12 and S14 of FIG. 2. And, the RI 40 sends, to the third device 13, not only RO of version 2 ($RO_1$) but also RO of version 1 ($RO_0$).

Here, the current domain members that belong to the second generation (G1) of the domain 20 are the first device 11 and the third device 13. The first device 11 and the third device 13 share not only digital contents of version 2 ($DCF_1$), but also digital contents of version 1 ($DCF_0$).

Here, if the third device 13 is mal-operated in the second generation (G1) of the domain 20, or is hacked or cracked by a malicious user, the third device 13 may leak out or illegally consume the digital contents of version 2 ($DCF_1$) at the second generation (G1) of the domain 20. Furthermore, since the third device 13 has the domain RO of version 1 ($RO_1$), and the domain key of version 1 ($DK_0$) at the first generation (GO) of the domain 20, the third device 13 may decode the digital contents of version 1 ($DCF_0$) by using the domain RO of version 1 ($RO_1$). Also, the third device 13 may illegally consume, or leak out the digital contents of version 1 ($DCF_0$)

As aforementioned, when members newly participating in a domain are mal-operated, or are hacked or cracked by a malicious user, contents in the domain before upgrade may be illegally used or may leak out, due to the previous domain key and domain RO before upgrade For domain upgrade, three processes S15~S17 of FIG. 2 have to be performed, which severely wastes networks. Especially, under a state that members of the domain are implemented in several tens of members in number, if the members simultaneously undergo the processes S15~S17 of FIG. 2, network resources are very severely wasted.

Furthermore, domain keys are issued through the processes shown in FIG. 2 at the time of domain upgrade, and devices participating in a domain after domain upgrade receive all domain keys of the previous generation. Accordingly, if the devices having joined a domain perform malicious actions, access to a domain RO of the previous generation before the joining is enabled. Accordingly, not only the current Domain contents, but also Domain contents of the previous generation may be illegally consumed in weak security.

SUMMARY OF THE INVENTION

Therefore, an object of the present invention is to provide domain upgrade to method in digital rights management (DRM) capable of more conveniently transferring a domain key.

More concretely, the present invention is to provide 1-pass Join Domain Protocol for domain upgrade.

To achieve these and other advantages and in accordance with the purpose of the present invention, as embodied and broadly described herein, there is provided a domain upgrade method for a terminal, comprising: receiving, from a server, a join domain response message including a domain ID field and a domain key; comparing a domain baseID of a domain ID field included in the join domain response message with a domain baseID of a domain ID stored in the terminal; comparing a domain generation of the domain ID field included in the join domain response message with a domain generation of the domain ID stored in the terminal, if the domain baseID of the domain ID field included in the join domain response is consistent with the domain baseID stored in the terminal; and changing a pre-stored domain key into the received domain key if the domain generation of the domain ID field included in the join domain response message is greater than the domain generation stored in the terminal.

According to another aspect of the present invention, there is provided a domain upgrade method for a terminal, comprising: receiving, from a terminal, a join domain request message; sending, to the terminal, a join domain response message including a domain ID field and a domain key in response to reception of the join domain request message; sending, to the terminal, a join domain response message including changed domain key and domain ID field if the domain is required to change.

In the present invention, the number of signals used to transfer a domain key is minimized to one, thereby reducing network resources.

Furthermore, a terminal that has joined a domain after domain upgrade is configured to receive only a domain key of a domain generation after the domain upgrade, not the previous domain generation. Accordingly, even when being mal-operated or hacked, the joined terminal is prevented from illegally consuming contents before domain upgrade, or from leaking out the contents.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is an exemplary view showing domain members according to each domain generation, and domain keys issued to the domain members in accordance with the conventional art;

FIG. 5 is an exemplary view showing domain members and domain keys issued to the domain members according to each domain generation;

FIG. 9 is an exemplary view showing domain members and domain keys issued to the domain members of FIG. 7 according to each domain generation;

DETAILED DESCRIPTION OF THE INVENTION

Figure 1:
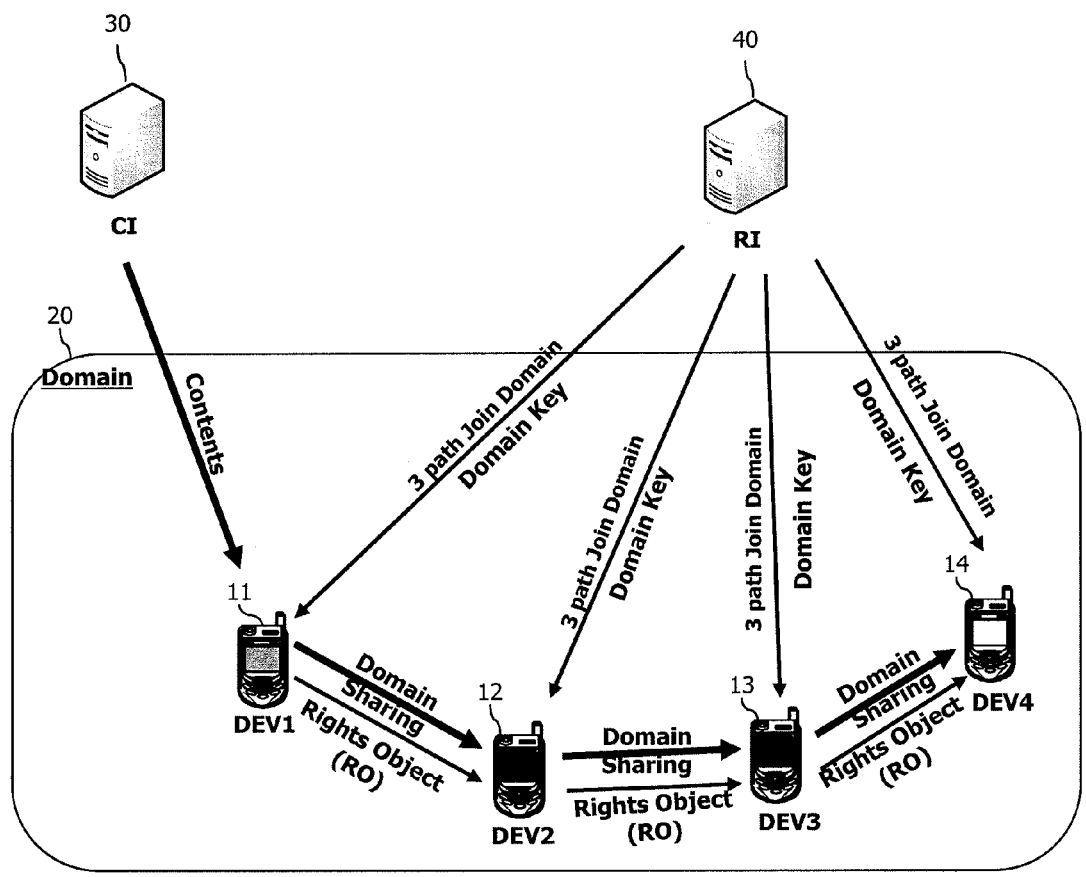
FIG. 1 is an exemplary view showing a domain in accordance with the conventional art.

Though the present invention may be variously modified and have several embodiments, specific embodiments will be shown in drawings and be explained in detail. However, the present invention may not be limited thereto, it is intended that the present invention cover modifications and variations of this invention provided they come within the scope of the appended claims and their equivalents.

Though terms including ordinal numbers such as a first, a second may be used to explain various components, the components are not limited to the terms. The terms are used only for the purposed of distinguishing one component from another component. For example, a first component may be named as a second component, or similarly, the second component may be named as the first component, without departing from the scope of the present invention. A term 'and/or' is used to include a combination of a plurality of disclosed items or one of the items.

Terms used in the present invention is to merely explain specific embodiments and don't intend to limit the present invention. A singular expression includes a plural expression except that two expressions are contextually different from each other. In the present invention, a term "include" or "have" is intended to indicate that characteristics, figures, steps, operations, components, elements disclosed on the specification or combinations thereof exist. Rather, the term "include" or "have" should be understood so as not to preexclude existence of one or more other characteristics, figures, steps, operations, components, elements or combinations thereof or additional possibility.

Except that they are not differently defined, all terms used in the present invention including technical or scientific terms have the same meanings with terms that are generally understood by those skilled in the art related to the field of the present invention. The terms same as those of which are defined in a general dictionary should be understood that the terms have meanings same as contextual meanings of the related art. And, as long as the terms are not definitely defined in the present invention, the terms are not interpreted as ideal or excessively formal meanings.

Hereafter, preferred embodiments in accordance with the present invention will be explained in detail with reference to accompanying drawings. Components same or corresponding to each other will have the same reference numeral and overlapped explanation regarding thereto will be omitted.

The term of 'device' used in the present invention includes all mobile communications devices using Digital Rights Management (DRM) (i.e., a user equipment (UE), a portable phone, a cellular phone, a DMB phone, a DVB-H phone, a PDA phone, and a PTT phone), a digital TV, a GPS navigation, a portable game machine, an MP3, and other home appliances. The device includes all kinds of wire/wireless devices that can use DRM contents.

Hereinafter, main features of preferred embodiments of the present invention will be explained in more detail, but explanation for minor features thereof will be substituted by OMA-TS-SCE_DOM-VO_3-20071025-D, and OMA-TS-DRM_DRM-V2_1-20070919-C.

Figure 4:
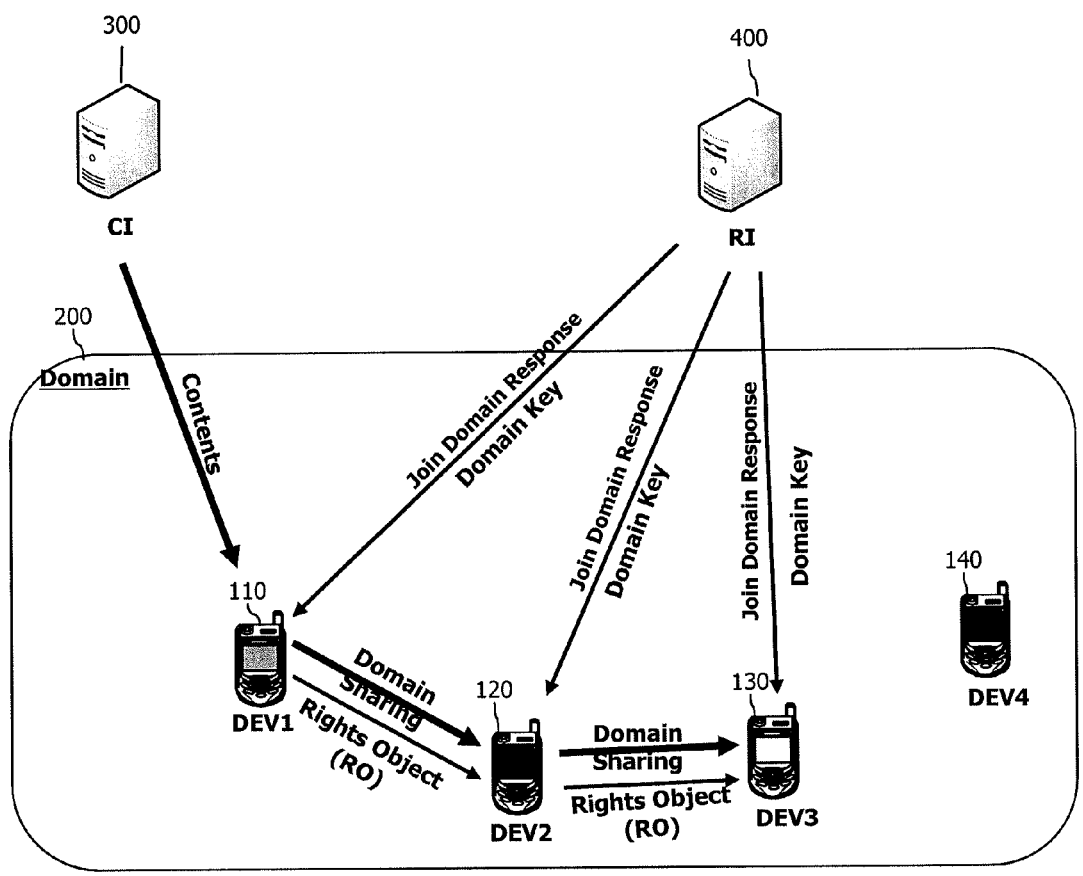
FIG. 4 is an exemplary view showing domain upgrade method according to a first embodiment of the present invention.
Figure 6:
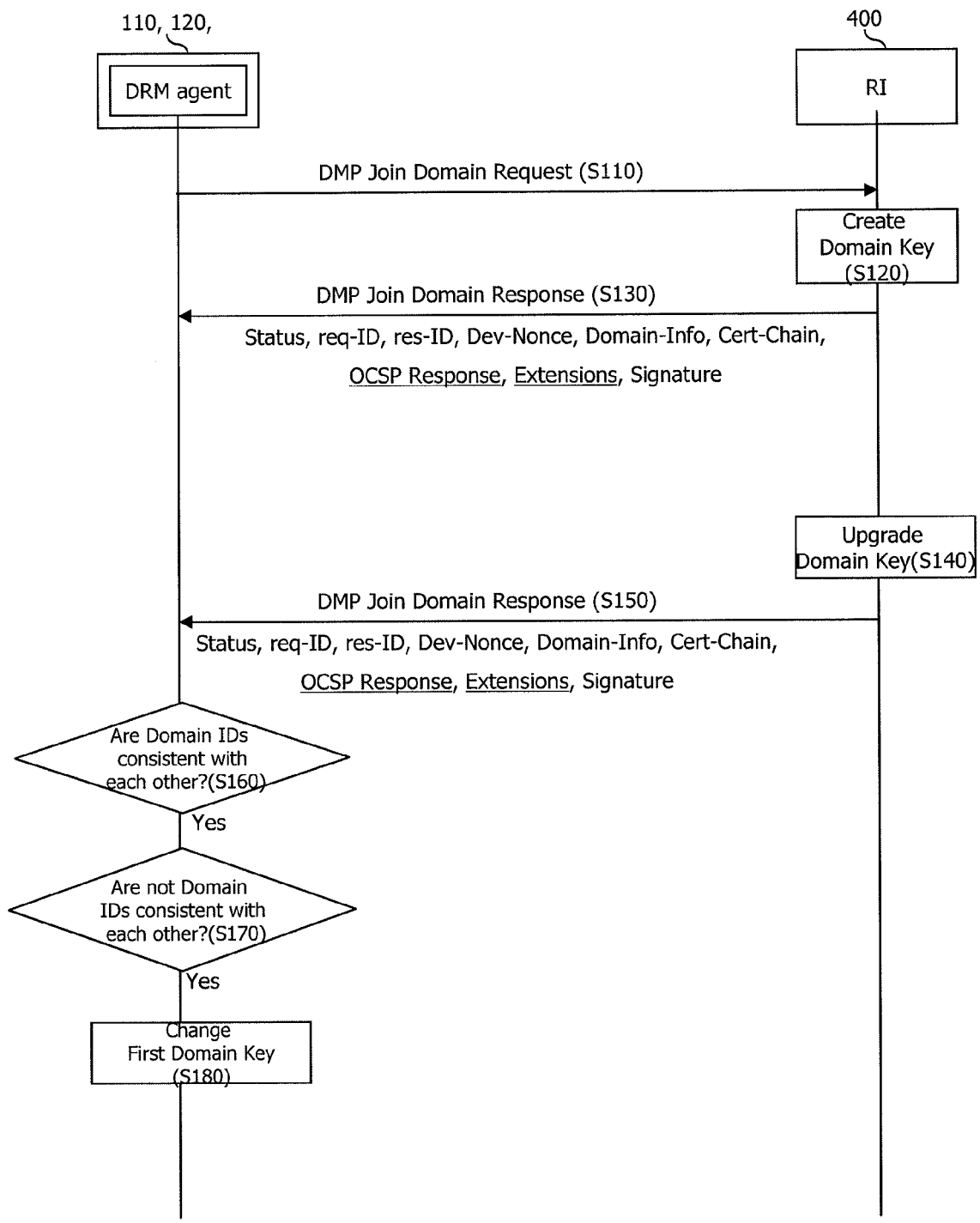
FIG. 6 is a flowchart showing a DRM system of FIG. 4.
Figure 7:
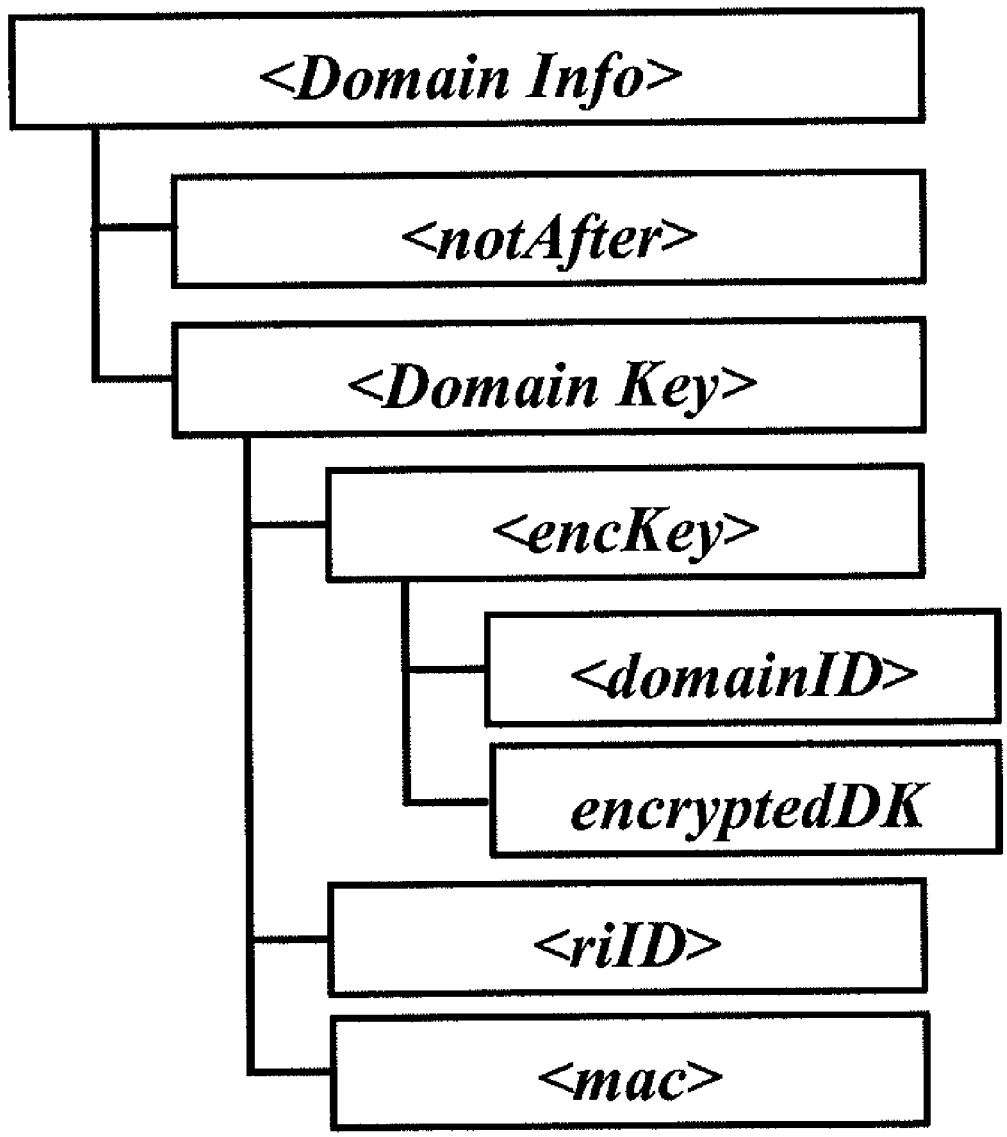
FIG. 7 is an exemplary view showing a configuration of one element inside a message of FIG. 6.

FIG. 4 is an exemplary view showing domain upgrade according to a first embodiment of the present invention, FIG. 5 is an exemplary view showing domain members and domain keys issued to the domain members according to each domain generation, FIG. 6 is a flowchart showing a DRM system of FIG. 4, and FIG. 7 is an exemplary view showing a configuration of one element inside a message of FIG. 6.

As shown in FIGS. 4 to 7, in the first embodiment of the present invention, the number of signals used to transfer an updated domain key is minimized to one, thereby reducing network resources. Furthermore, a terminal that has joined a domain after domain upgrade is configured not to receive a domain key of the previous domain generation, but to receive only a domain key of a domain generation after the domain upgrade.

More specifically, under a state that a user domain 200 of FIG. 4 is implemented to have a first generation (GO) of FIG. 5, in order for a first device 110 and a second device 120 to join (or register) the user domain 200, DRM Agents of the first and second devices 110 and 120 sends, to a Rights Issuer (RI) 400, a message for requesting to join (or register) a domain of FIG. 6 (e.g., Join Domain Request message) (S100).

The RI 400 creates a domain key of version 1 ($DK_0$) (S120), and then is sends the created $DK_0$, to the first and second devices 110 and 120, with including in a message for responding with respect to join (or register) a domain (e.g., Join Domain Response message) (S130). Here, the Join Domain Response message includes the following elements.

Status: domain status about whether update is possible or not req-ID: ID of device Res-ID: Response ID, ID of the RI(400)

Dev-Nonce: Random Value

Domain-Info: As shown in FIG. 7, Domain-Info includes <notAfter> indicating lifetime of a domain key, and <domain key>. The <domain key> includes <encKey> element, <riID> element, and <mac> element. The <encKey> element includes 'domainID' field, and 'encryptedDK' field. The 'domainID' field includes 'domain baseID' indicating an ID of the user domain 200, and 'domain generation' indicating that the user domain 200 has a first generation (GO). And, the 'encryptedDK' field includes the domain key of version 1 ($DK_0$).

Certificate Chain (optional): x.509 Certificate of the RI(400)

OCSP Response (optional): OCSP response message about certificate of the RI, which indicates whether the certificate of the RI is valid or not.

Extensions

Signature: RSA digital signature about Join Domain Response message

The 'domainID' (Domain Identifier) fields will be explained in more detail with reference to the following table.

| | | |
|---|---|---|
| Domain Identifier (e.g., XYZ0123456789ABC000) | domain baseID | Indicating an ID of the user domain(200) Corresponding to first texts of the Domain Identifier (e.g., when the Domain Identifier is XYZ0123456789ABC000, domain baseID is XYZ0123456789ABC.) |
| | domain generation | Indicating the number of times the user domain 200 has been updated Corresponding to the last three numbers in the Domain Identifier (e.g., when the Domain Identifier is XYZ0123456789ABC000, domain generation is 000.) |

As shown in FIG. 4, the first and second devices 110 and 120 receive, from the RI 400, an RO of version 1 ($RO_0$) for sharing. And, the first and second devices 110 and 120 receive, from the Content Issuer (CI)(300), contents of version 1 ($DCF_0$) for sharing.

DRM Agents of the first and second devices 110 and 120 decode the RO of version 1 ($RO_0$) by using the domain key of version 1 ($DK_0$), and consume the contents of version 1 ($DCF_0$) according to Permission and/or Constraint included in the decoded RO of version 1 ($RO_0$).

However, if the second device 120 is mal-operated or compromised as shown in FIG. 5, or is hacked or cracked by a malicious user, the RI 400 revokes the second device 120 from the user domain 200. And, the RI 400 upgrades generation of the user domain 200 to a second generation (G1) from a first generation (G0). That is, the RI 400 increases a domain generation (i.e., Domain Version). Here, the domain generation is increased by one, and has a maximum value of 999. Once the domain generation has a maximum value, the user domain 200 can not be used any longer.

As shown in FIG. 6, the RI 400 upgrades the domain key of version 1 ($DK_0$) into a domain key of version 2 ($DK_1$) (S140).

And, the RI 400 performs 1-pass JoinDomain Protocol with other reliable domain members, i.e., the first device 110.

More concretely, the RI 400 sends, the updated domain key of version 2 ($DK_1$), to other devices rather than the second device 120, i.e., the first device 110, with including in a message for responding with respect to join (or register) a domain (e.g., Join Domain Response message) of FIG. 6 (S150). Here, the RI(400) may reinforce security by sending the updated domain key of version 2 ($DK_1$) with encryption using each public key of other devices, i.e., the first device 110.

As aforementioned, the Join Domain Response message includes Status, req-ID, Res-Id, Dev-Nonce, Domain-Info, Certificate Chain (optional), OSCP Response (optional), Extensions (optional), and Signature elements. As shown in FIG. 7, the Domain-Info element includes 'domainID'(Domain Identifier) field including 'domain baseID' indicating an ID of the user domain 200, and 'domain generation' indicating that the user domain 200 has the second generation (G1); and encryptedDK field including the domain key of version 2 ($DK_1$). The domain key ($DK_1$) is encrypted by using a public key of a device. The RI 400 provides newly created domain key of version 2 ($DK_1$), only to reliable domain members (devices), thereby protecting $RO_1$ and contents ($DCF_1$) created after domain upgrade.

Figure 2:
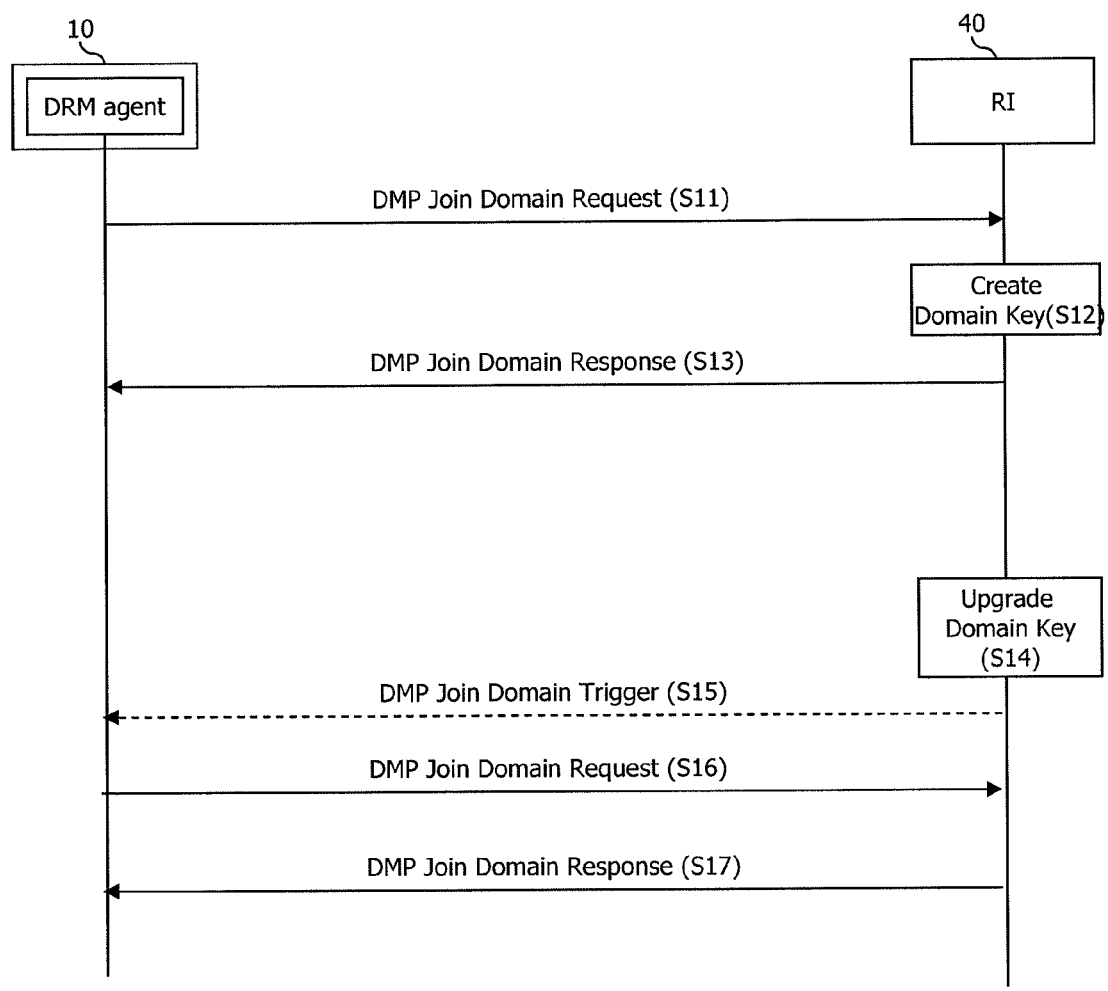
FIG. 2 is a flowchart showing a DRM system of FIG. 1 in accordance with the conventional art.

In the conventional art, a method for transferring updated domain keys is performed by three steps (S15~S17) of FIG. 2 (Join Domain Inducing message, Join Domain Request message, and Join Domain Response message), thereby wasting network resources. However, in the first embodiment of the present invention, only 1-pass Join Domain protocol (i.e., Join Domain Response message) is used, thereby reducing network resources.

Once receiving the Join Domain Response message, the DRM Agent of the first device 110 compares domain ID field included in the received Join Domain Response message, with a domain ID field of the user domain 200 established with the RI 400.

More concretely, the DRM Agent of the first device 110 compares 'domain baseID' of the domain ID field included in the received Join Domain Response message, with 'domain baseID' of the domain ID field pre-stored in the first device 110 (S160). Here, it is assumed that the 'domain baseID' of the domain ID field has been included in the Join Domain Response message having been received in S130.

If the two 'domain baseID' values are equal to each other, i.e., if the same domain ID exists, the DRM Agent of the first device 110 compares 'domain generation' of domain ID field included in the received Join Domain Response message, with 'domain generation' of domain ID field pre-stored in the first device 110 (S170). Here, it is assumed that the 'domain generation' of domain ID field pre-stored in the first device 110 has been included in the Join Domain Response message having been received in S130.

If the two 'domain generation' values are different from each other, i.e., if the 'domain generation' of domain ID field included in the received Join Domain Response message is larger than the 'domain generation' of domain ID field pre-stored in the first device 110, the DRM Agent of the first device 110 changes the domain key of version 1 ($DK_0$) into the domain key of version 2 ($DK_1$) (S180).

After the user domain 200 is updated to the second generation (G1) from the first generation (G0), in order to join the second generation (G1) of the user domain 200, the third device 130 sends, to the RI 400, a message requesting to join a domain (e.g., Join Domain Request message) as shown in FIG. 6 (S110).

Then, as shown in FIG. 6, the RI 400 sends, to the third device 130, a message for responding with respect to join a domain (e.g., Join Domain Response message) (S130). Here, the Join Domain Response message includes the aforementioned elements. That is, the Join Domain Response message includes domain ID field including 'domain baseID' indicating an ID of the user domain 200, and 'domain generation' indicating that the user domain 200 has the second generation (G1); and the domain key of version 2 (DK1).

It should be noted that the Join Domain Response message includes only the domain key of version 2 ($DK_1$) of the second generation (G1). The reasons why the Join Domain Response message includes not the domain key of version 1 ($DK_0$) but the domain key of version 2 ($DK_1$), are in order to prevent the contents of version 1 ($DCF_0$) of the first generation (G0) from being illegally consumed or leaking out when the third device 130 is mal-operated or is hacked or cracked by a malicious user.

The third device 130 receives the RO of version 2 ($RO_1$), decodes the RO of version 2 ($RO_1$) by using the obtained domain key of version 2 ($DK_1$), and then consumes the contents of version 2 ($DCF_1$) according to the RO of version 2 ($RO_1$).

Later, the third device 130 is mal-operated, or is hacked or cracked by a malicious user. However, since the third device 130 has the domain key of version 2 ($DK_1$) of the second generation (G1), only the contents of version 2 ($DCF_1$) of the second generation (G1) may be illegally consumed or leak out. That is, since the third device 130 does not have the domain key of version 1 ($DK_0$), the third device 130 can not decode an obtained domain RO of version 1 (domain $RO_0$). Accordingly, the contents of version 1 ($DCF_0$) are prevented from being illegally consumed or leaking out.

Figure 8:
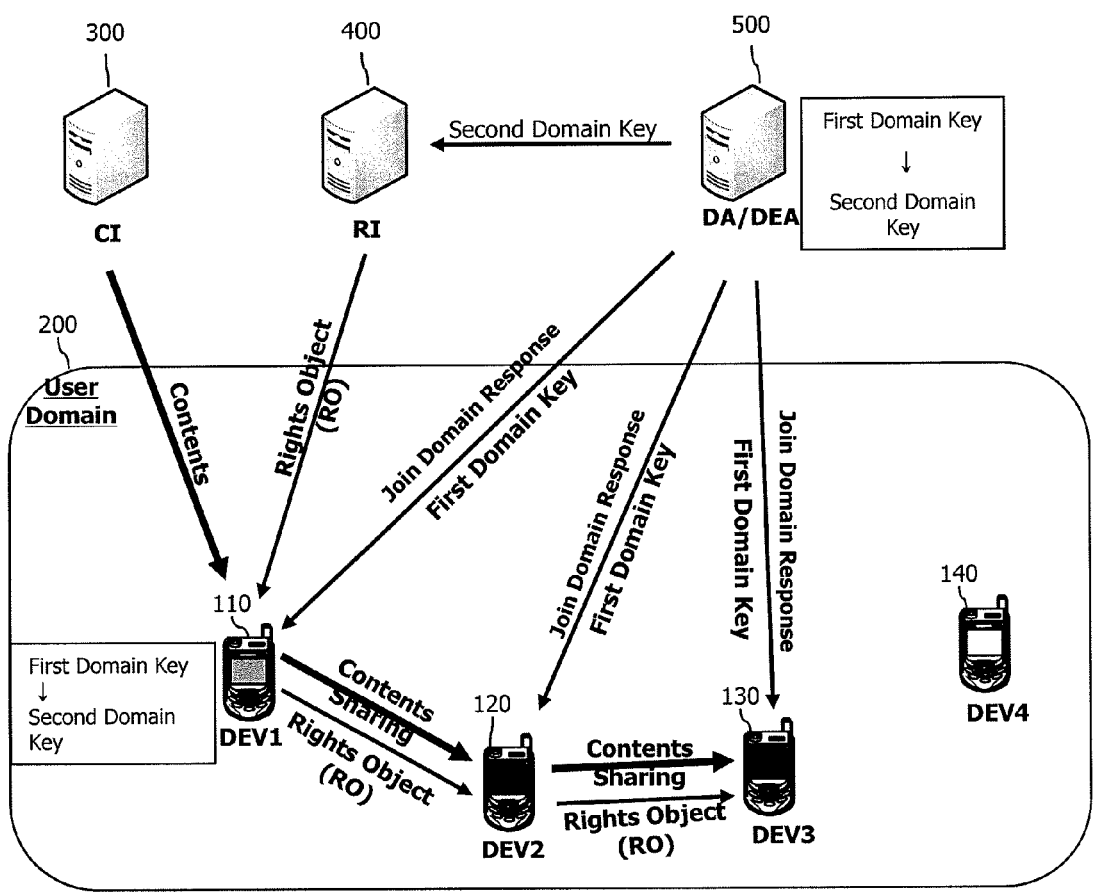
FIG. 8 is an exemplary view showing domain upgrade method according to a second embodiment of the present invention.
Figure 10:
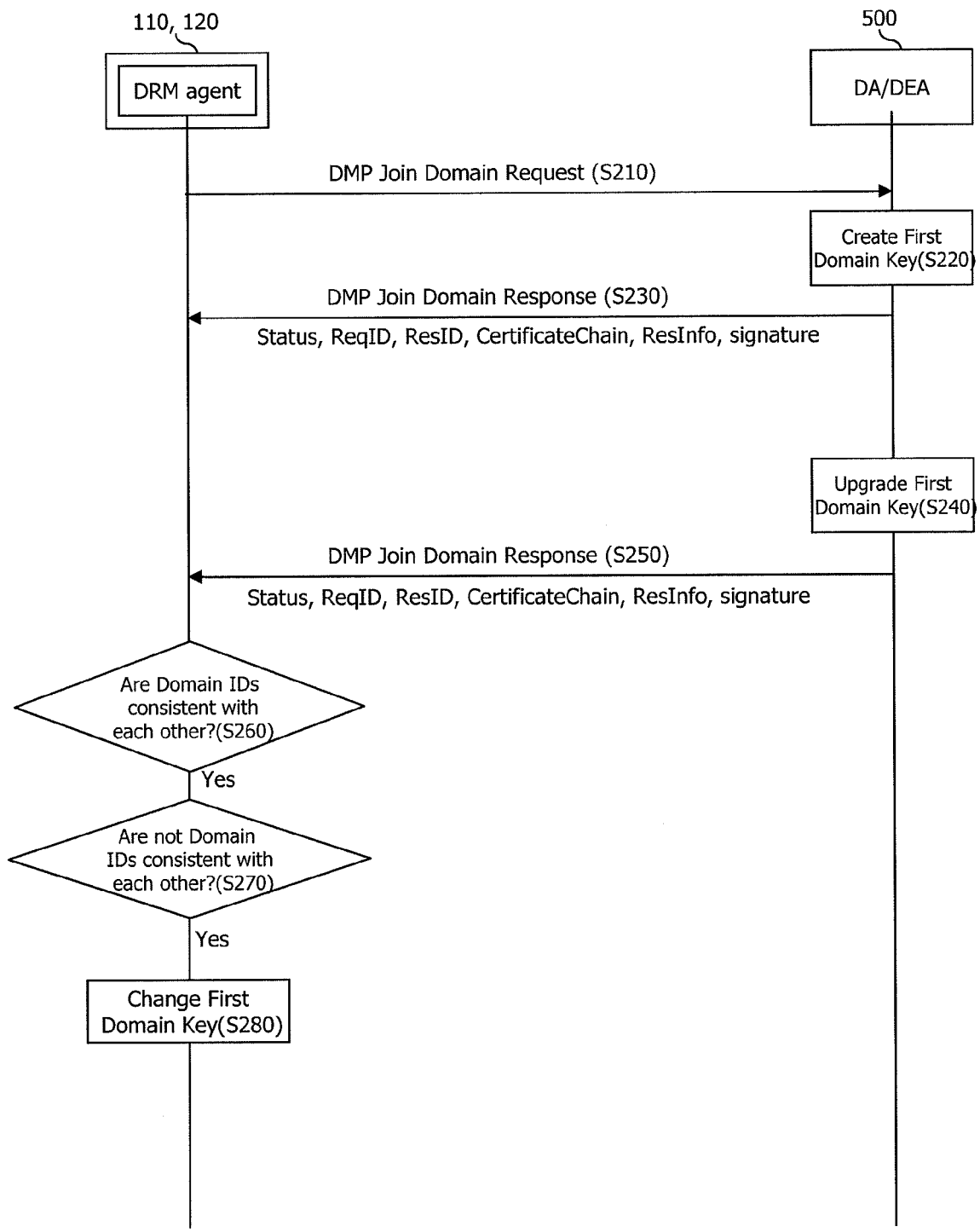
FIG. 10 is a flowchart showing a DRM system a domain upgrade method of FIG. 7.
Figure 11:
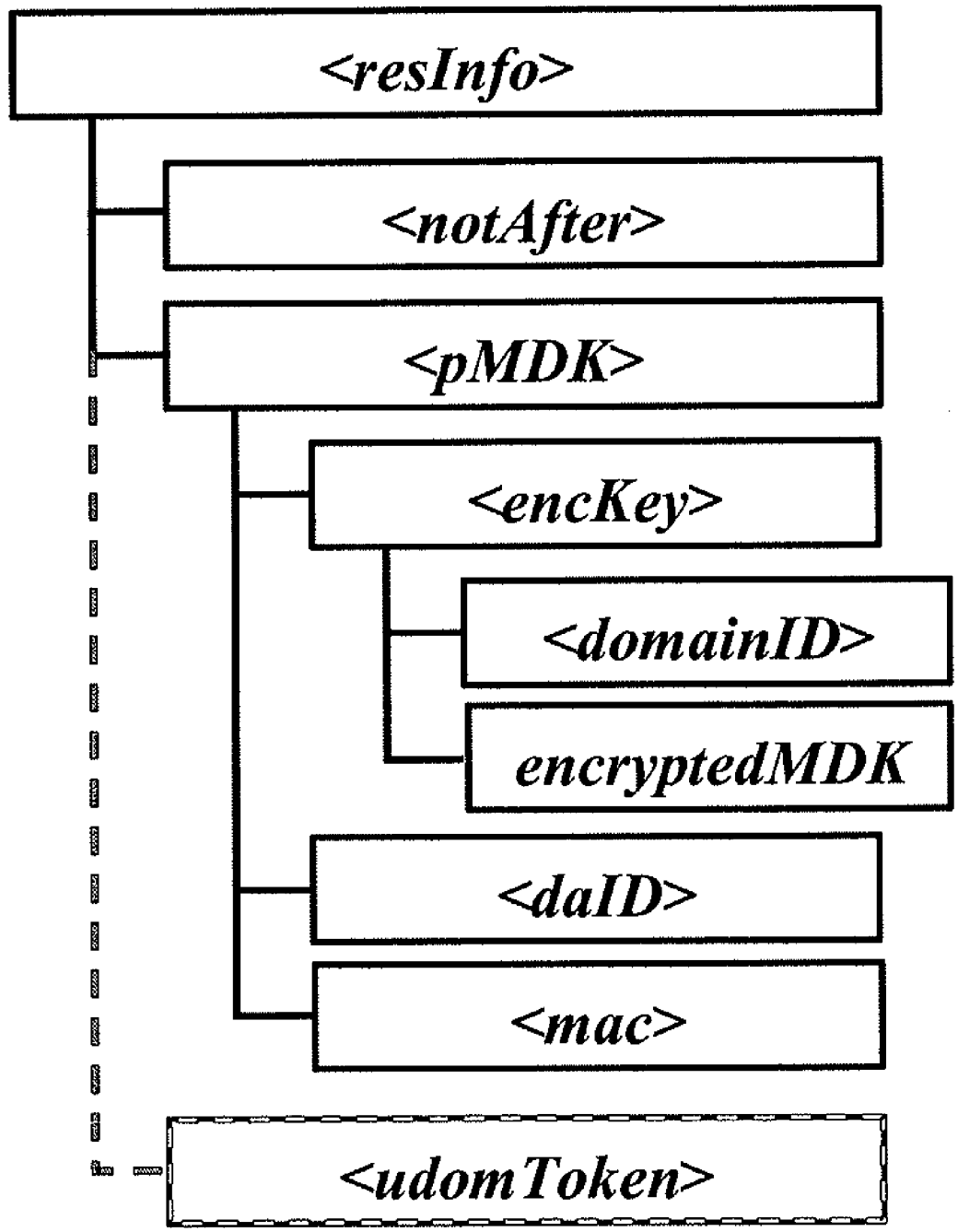
FIG. 11 is an exemplary view showing a configuration of one element inside a message of FIG. 10.

FIG. 8 is an exemplary view showing domain upgrade method according to a second embodiment of the present invention, FIG. 9 is an exemplary view showing domain members and domain keys issued to the domain members according to each domain generation, FIG. 10 is a flowchart showing a DRM system of FIG. 8, and FIG. 11 is an exemplary view showing a configuration of one element inside a message of FIG. 10;

Referring to FIGS. 8 to 11, in the second embodiment of the present invention, there is provided a concept of user domain 200, and Domain Authority ('DA')/Domain Enforcement Agent ('DEA') 500, so as to share an RO with regarding devices inside a specific domain as belongings of one person. Here, the DA/DEA 500 is an entity to manage the user domain 200, in which the DA is an entity to define a domain policy with respect to the user domain 200, and the DEA is an entity to perform the defined Domain Policy.

In the second embodiment of the present invention, domain key is classified into first domain key (Master Domain Key: 'MDK'), and second domain key (Diversified Domain Key: 'DDK'), and the first domain key ('MDK') is transferred to the devices 110~140. Furthermore, in the second embodiment of the present invention, the number of signals used to transfer the first domain key ('MDK') is simplified into one, thereby reducing network resources.

In summary, the second embodiment of the present invention is differentiated from the first embodiment in that a process for joining and upgrading a domain is managed by the DA/DEA 500, and the DA/DEA 500 issues the first domain key ('MDK') to the devices.

The second embodiment of the present invention will be explained in more detail with reference to FIGS. 8 to 11. Here, explanations about the same parts or similar parts of the second embodiment as/to those of the first embodiment will be omitted, but will be substituted by detailed explanations about the first embodiment. Under a state that the user domain 200 of FIG. 8 has the first generation (G0) of FIG. 9, in order for the first and second devices 110 and 120 to join the user domain 200, the DRM Agents of the first and second devices 110 and 120 send, to the DA/DEA 500, a message requesting to join a domain (e.g., DMP Join Domain Request message) (S210).

The DA/DEA 500 creates first domain key of version 1, i.e., Master domain key of version 1 ($MDK_0$) (S220), and then sends, to the first and second devices 110 and 120, the created first domain key of version 1 ($MDK_0$) with including in a message for responding with respect to join (or register) a domain (e.g., DMP Join Domain Response message) (S230). Here, the Join Domain Response message includes the following elements.

Status: whether joining the user domain has succeeded or failed.

req-ID: ID of device.

Res-ID: Response ID, ID of the DA/DEA 500

Nonce: Random Value selected by the DA/DEA 500

Certificate Chain (optional): x.509 Certificate of the DA/DEA 500

OCSP Response (optional): OCSP Response message with respect to the Certificate of the DA/DEA 500, which indicates whether the Certificate of the DA/DEA 500 is valid or not.

ResInfo: As shown in FIG. 11, ResInfo includes <notAfter> indicating lifetime of a domain key, and <pMDK>. The <pMDK> includes <enckey> element, <daID> element, and <mac> element. The <encKey> element includes 'domainID' field, and 'encryptedDK' field. The 'domainID' field includes 'domain baseID' indicating an ID of the user domain 200, and 'domain generation' indicating that the user domain 200 has a first generation (G0). And, the 'encryptedMDK' field includes the domain key of version 1 ($MDK_0$).

Signature: RSA digital signature with respect to Join Domain Response message

Explanations about the 'domainID' (Domain Identifier) fields will be omitted by referring to the aforementioned table.

As shown in FIG. 8, the DA/DEA 500 creates second domain key of version 1 (Diversified Domain Key of version 1: $DDK_0$) by using the created first domain key of version 1 (Master Domain Key of version 1: $MDK_0$). Then, the DA/DEA 500 sends, to the RI 400, the created second domain key of version 1 ($DDK_0$).

Then, as shown in FIG. 8, the RI 400 encrypts the RO of version 1 ($RO_0$) by using the second domain key of version 1 ($DDK_0$) received from the DA/DEA 500, and then sends the encrypted $RO_0$ to the first device 110.

As shown in FIG. 8, once receiving the $RO_0$ from the RI 400, the first device 110 sends the received $RO_0$ to the second device 120 for sharing. Here, the first and second devices 110 and 120 may share ROs issued from different RIs.

As shown in FIG. 8, the first device 110 receives contents of version 1 ($DCF_0$) from the CI 300, and sends the received $DCF_0$ to the second device 120 for sharing.

As shown in FIG. 8, the DRM Agents of the first and second devices 110 and 120 creates second domain key of version 1 (Diversified domain key of version 1: $DDK_0$) by using the first domain key of version 1 (Master domain key of version 1: $MDK_0$) included in the Join Domain Response message received from the DA/DEA 500. Then, the DRM Agents of the first and second devices 110 and 120 decode the received RO of version 1 ($RO_0$) by using the second domain key of version 1 ($DDK_0$), and consume the contents of version 1 ($DCF_0$) received from the CI 300 according to Permission and/or Constraint included in the decoded RO of version 1 ($RO_0$).

However, as shown in FIG. 9, if the second device 120 is mal-operated or is hacked by a malicious user, the DA/DEA 500 revokes the second device 120 from the user domain 200.

And, the DA/DEA 500 upgrades generation of the user domain 200 to the second generation (G1) from the first generation (G0). Detailed explanations of the second embodiment will be omitted by referring to those of the first embodiment.

As shown in FIG. 10, the DA/DEA 500 updates the first domain key of version 1 ($MDK_0$) into the first domain key of version 2 ($MDK_1$) (S240).

The DA/DEA 500 sends, to other devices rather than the second device, i.e., the first device 110, with including in a message for responding to join a domain of FIG. 10 (e.g., DMP Join Domain Response message) (S250). Detailed explanations of the second embodiment will be omitted by referring to those of the first embodiment.

As aforementioned, the Join Domain Response message includes elements such as Status, req-ID, Res-ID, Nonce, Certificate Chain (optional), OCSP Response (optional), ResInfo, and Signature. As shown in FIG. 11, the ResInfo element includes 'domainID' field including 'domain baseID' indicating an ID of the user domain 200, and 'domain generation' indicating that the user domain 200 has a second generation (G1); and encryptedMDK field including the first domain key of version 2 ($MDK_1$).

Once receiving the Join Domain Response message, the DRM Agent of the first device 110 compares domain ID field included in the received Join Domain Response message, with a domain ID field of the user domain 200 established with the DA/DEA 400 (S260, S270). Then, the DRM Agent of the first device 110 adds the first domain key of version 2 ($MDK_1$) to the pre-stored first domain key of version 1 ($MDK_0$) (S280). Details of the second embodiment are equal to those shown in S160~S180, and thus their explanations will be omitted by referring to those of the first embodiment.

More specifically, after the user domain 200 is updated to second generation (G1) from first generation (G0), when the third device 130 is to join or register the second generation (G1) of the user domain 200, a DRM Agent of the third device 130 sends, to the DA/DEA 500, a message for requesting to join or register a domain (e.g., DMP Join Domain Request message) as shown in FIG. 10 (S210). Then, as shown in FIG. 10, the DA/DEA 500 sends, to the DRM Agent of the third device 130, a message for responding to join a domain (e.g., DMP Join Domain Response message) (S240). Here, the Join Domain Response message includes the same elements as those of S250. Accordingly, details thereof will be omitted by referring to those of S250.

The DRM Agent of the third device 130 creates second domain key of version 2 (Diversified domain key of version 2: $DDK_1$) by using the first domain key of version 2 (Master domain key of version 2: $MDK_1$). Then, the DRM Agent of the third device 130 receives the RO of version 2 ($RO_1$), decodes the received RO of version 2 ($RO_1$) by using the second domain key of version 2 ($DDK_1$), and consumes the contents of version 2 ($DCF_1$) according to the RO of version 2 ($RO_1$).

Later, the third device 130 is mal-operated, or is hacked by a malicious user. However, since the third device 130 has the Master domain key of version 2 ($MDK_1$), that is, the first domain key of version 2 of the second generation (G1), only the contents of version 2 ($DCF_1$) of the second generation (G1) may be illegally consumed or leak out. That is, since the third device 130 does not have the Master domain key of version 1 ($MDK_0$), that is, the first domain key of version 1, the third device 130 can not create the second domain key of version 1, that is, diversified domain key of version 1 ($DDK_0$). Accordingly, even if the third device 140 obtains domain RO of version 1 ($RO_0$), the third device 140 can not decode the domain RO of version 1 ($RO_0$) due to no second domain key of version 1 (diversified domain key of version 1: $DDK_0$). As a result, the third device 140 is prevented from illegally consuming or leaking out the contents of version 1 ($DCF_0$).

In addition, the above various embodiments may be implemented by software, hardware or some combination thereof. For instance, the domain upgrade method in DRM according to the present invention may be implemented in a storage medium (e.g., memory inside a mobile device, flash memory, hard disc, etc.), or may be implemented in codes or commands inside a software program that can be executed by a processor (e.g., microprocessor inside a mobile device).

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A domain upgrade method for a terminal, comprising:
   receiving, by a terminal which has a first rights object (RO) and a first domain key, a join domain response message including a domain ID field and a second domain key,
   wherein the domain ID field includes a 'domain baseID' for indicating an ID of a first domain among a plurality of domains managed by an entity, and
   wherein the join domain response message further includes a domain generation indicating a generation of the first domain;
   comparing the domain baseID of the domain ID field included in the join domain response message with a domain baseID of a domain ID stored in the terminal;
   if the domain baseID of the domain ID field included in the join domain response message is not consistent with the domain baseID stored in the terminal, performing a first procedure for joining the first domain; and
   if the domain baseID of the domain ID field included in the join domain response message is consistent with the domain baseID stored in the terminal, performing a second procedure for upgrading the first domain,
   wherein the second procedure includes:
      comparing the domain generation included in the join domain response message with a domain generation stored in the terminal; and
      storing the second domain key, which is contained in the join domain response message, based on a result from the comparison,
   wherein the first domain key is associated with the domain generation stored in the terminal and is maintained to allow the first rights object to be still used after upgrading the first domain, and
   wherein the received second domain key is associated with the domain generation included in the join domain response message and allows a second rights object to be used.

2. The method of claim 1, wherein the join domain response message is based on a one-way protocol and is a 'dmp Join Domain Response' message.

3. The method of claim 1, wherein the domain ID field corresponds to a 'domain ID field' in the join domain response message.

4. The method of claim 1, wherein the server is a Right Issuer, or a Domain Authority/Domain Enforcement Agent (DA/DEA).

5. The method of claim 1, the storing step is performed if the domain generation included in the join domain response message is greater than the domain generation stored in the terminal.

6. A domain upgrade method for a terminal, comprising:
sending, to a terminal which wants to join into a first domain, a first join domain response message including a domain ID field and a first domain key,
wherein the domain ID field comprises a 'domain baseID' element indicating an ID of the first domain among a plurality of domains and the first join domain response message further includes a 'domain generation' element indicating a first generation of the first domain;
upgrading the first domain by generating a second domain key and a second generation of the first domain; and
sending, to the terminal, a second join domain response message including the second domain key,
wherein the second join domain response message further includes a domain ID field,
wherein the domain ID field comprises a 'domain baseID' element indicating the same ID of the first domain, thereby to be compared with the domain baseID of the domain ID included in the first join domain response message and stored in the terminal,
wherein the second join domain response message further includes a 'domain generation' element indicating the second generation, thereby to be compared with the 'domain generation' element included in the first join domain response message and stored in the terminal,
wherein the first domain key is associated with the first generation and allows a first rights object (RO) to be used by the terminal, and
wherein the second domain key is associated with the second generation and allows a second rights object (RO) to be used by the terminal.

7. The method of claim 6, wherein the message is a 'dmp-JoinDomainResponse' message.

8. The method of claim 6, wherein the domain ID field corresponds to a 'domID' field in the message.

9. The method of claim 6, wherein the upgrading step is performed if another terminal included in the domain is revoked by the server or the first domain key is compromised by the another terminal.

10. The method of claim 6, wherein the second generation is generated by increasing the first domain generation by 1.

11. The method of claim 6, wherein the second domain key included in the join domain response message had been upgraded from the first domain key by the server if another terminal included in the domain is revoked by the server or the first domain key is compromised by the another terminal, wherein the join domain response message is transmitted from the server to terminals which are still trusted by the server.

12. The method of claim 6, wherein the join domain response message is transmitted from the server to terminals which are still trusted by the server.

13. A domain upgrade method for a terminal, comprising:
receiving, by a terminal, a first join domain response message including a domain ID field and a first domain key, wherein the domain ID field includes a 'domain baseID' for indicating an ID of a first domain among a plurality of domains managed by an entity;
if there does not exist a domain baseID matching with the domain baseID of the domain ID field included in the first join domain response message, performing a first procedure for joining the first domain thereby to obtain a first rights object (RO);
consuming contents using the first RO;
receiving, by the terminal, a second join domain response message including a domain ID field and a second domain key, wherein the domain ID field in the second join domain response message includes a 'domain baseID' for indicating the ID of the first domain;
comparing the domain baseID of the domain ID field included in the second join domain response message with the domain baseID of the domain ID stored in the terminal;
if the domain baseID of the domain ID field included in the second join domain response message is consistent with the domain baseID stored in the terminal, performing a second procedure for upgrading the first domain,
wherein the second procedure includes:
comparing a domain generation included in the second join domain response message with a domain generation stored in the terminal; and
storing the second domain key, which is contained in the second join domain response message, based on a result from the comparison,
wherein the first domain key is associated with the domain generation stored in the terminal and is maintained to allow the first rights object to be still used after upgrading the first domain, and
wherein the received second domain key is associated with the domain generation included in the second join domain response message and allows a second rights object to be used.

* * * * *